(12) United States Patent
Chandlee

(10) Patent No.: US 10,442,071 B1
(45) Date of Patent: Oct. 15, 2019

(54) INSECT MUD NEST REMOVAL ASSEMBLY

(71) Applicant: Ellis George Chandlee, Broken Arrow, OK (US)

(72) Inventor: Ellis George Chandlee, Broken Arrow, OK (US)

(*) Notice: Subject to any disclaimer, the term of this patent is extended or adjusted under 35 U.S.C. 154(b) by 142 days.

(21) Appl. No.: 15/402,351

(22) Filed: Jan. 10, 2017

Related U.S. Application Data

(60) Provisional application No. 62/305,872, filed on Mar. 9, 2016.

(51) Int. Cl.
| | | |
|---|---|---|
| *A47L 13/10* | (2006.01) | |
| *B25G 1/04* | (2006.01) | |
| *B08B 3/08* | (2006.01) | |
| *B08B 3/02* | (2006.01) | |
| *B08B 1/00* | (2006.01) | |
| *B08B 5/02* | (2006.01) | |
| *A01M 7/00* | (2006.01) | |

(52) U.S. Cl.
CPC ............. *B25G 1/04* (2013.01); *A01M 7/00* (2013.01); *B08B 1/002* (2013.01); *B08B 1/005* (2013.01); *B08B 3/026* (2013.01); *B08B 3/08* (2013.01); *B08B 5/02* (2013.01); *A47L 13/10* (2013.01)

(58) Field of Classification Search
CPC ........................................................ A47L 13/10
USPC ................ 401/25, 26, 37, 39, 270, 282, 289
See application file for complete search history.

(56) References Cited

U.S. PATENT DOCUMENTS

| | | | | |
|---|---|---|---|---|
| 5,271,682 A * | 12/1993 | Realdon | .................... | A47L 1/08 |
| | | | | 401/146 |
| 8,672,573 B2 * | 3/2014 | Francoeur | ............ | A46B 5/0008 |
| | | | | 222/132 |

* cited by examiner

*Primary Examiner* — David J Walczak
*Assistant Examiner* — Joshua R Wiljanen
(74) *Attorney, Agent, or Firm* — GableGotwals

(57) ABSTRACT

An insect nest removal assembly includes a telescopic pole that has a fluid coupling at one end, a head coupling at another end, and a sealed hollow interior extending an entire length between the fluid and head couplings; a head connected to the head coupling that includes a blade, a brush, and a passage in fluid communication with the sealed hollow interior of the telescopic pole and the brush; and a fluid control valve connected to the hollow interior of the telescopic pole.

17 Claims, 13 Drawing Sheets

INSECT MUD NEST REMOVAL ASSEMBLY

CROSS-REFERENCE TO PENDING APPLICATIONS

This application claims priority to U.S. Provisional Patent Application No. 62/305,872, filed Mar. 9, 2016.

TECHNICAL FIELD

Subject matter disclosed herein generally relates to removal of insect mud nests.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

Figure 1:
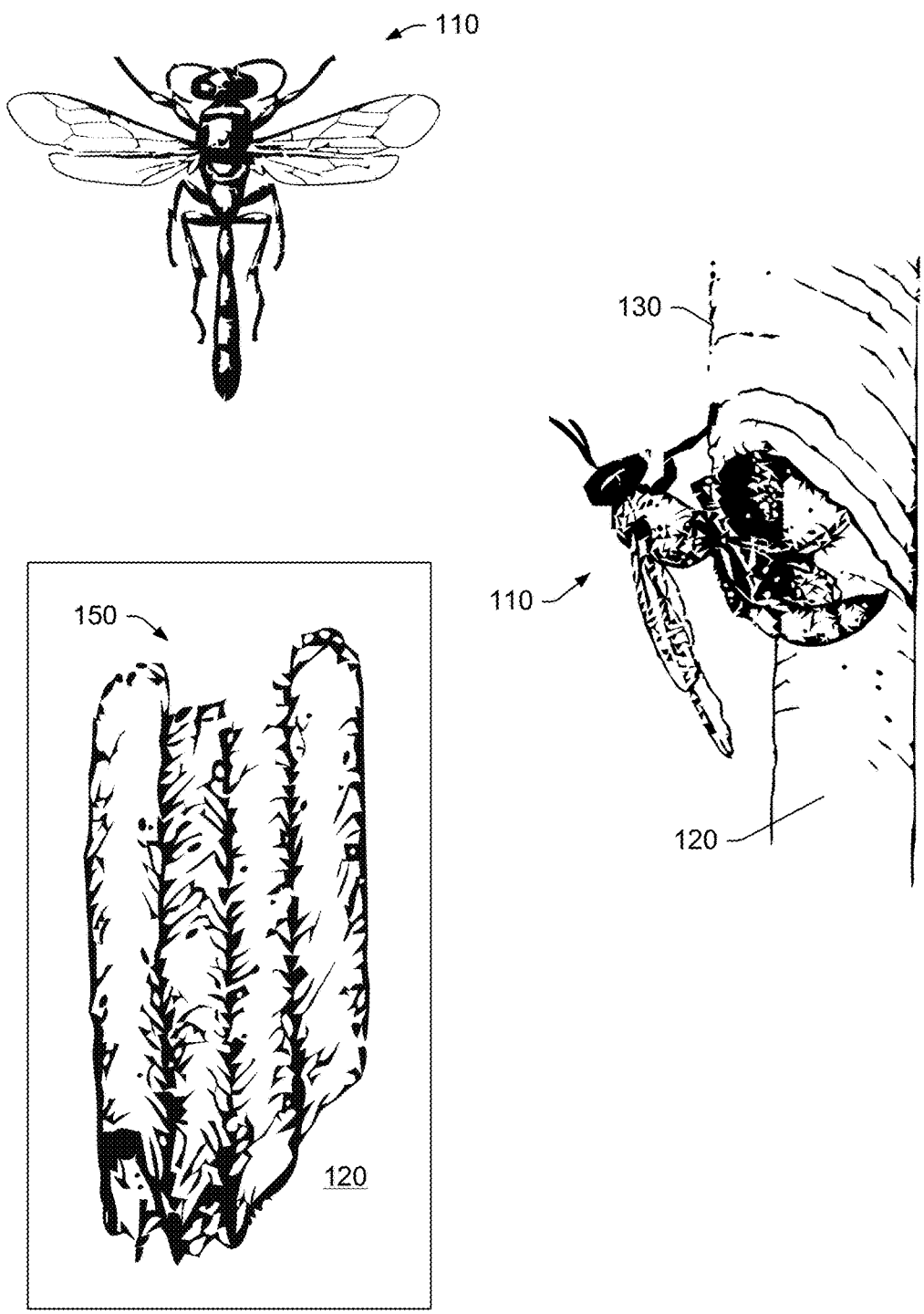
FIG. 1 illustrates an example of an insect and its nest.

FIG. 1 shows an example of an insect 110 that can identify a substrate 120 and that can construct a nest 130 on the substrate 120. As shown in FIG. 1, the nest 130 can be a singular structure or can be a plurality of structures 150.

Species of mud dauber wasps include, for example, *Trypoxylon politum*, *Trypoxylon clavatum*, *Sceliphron caementarium*, and *Chalybion californicum*. *Trypoxylon politum* constructs long, tubular nests of mud, and is common throughout the eastern United States. This species is often seen at the edge of mud puddles collecting mud to construct their tubular nests. The female wasp collects this mud in her mandibles, which she mixes with her saliva and takes back to the chosen substrate on which her nest will be built. The organ pipe mud dauber wasp tends to be solitary; each female constructs her own nest, unlike social wasps. After the female wasp selects a nest site and constructs her nest, she will then hunt and paralyze spiders to place in the nest as a food source for her offspring. Meanwhile, a male wasp may guard the nest while the female hunts. Once the cell is sufficiently supplied with spiders, she then lays an egg, and seals the cell off with mud. After two to three days, the egg hatches and the larva feeds on captured spiders for approximately ten days. Then the larva spins a cocoon and overwinters as a prepupa. The following spring it will continue its development into an adult that will emerge by chewing its way to freedom through the nest wall.

Figure 9:
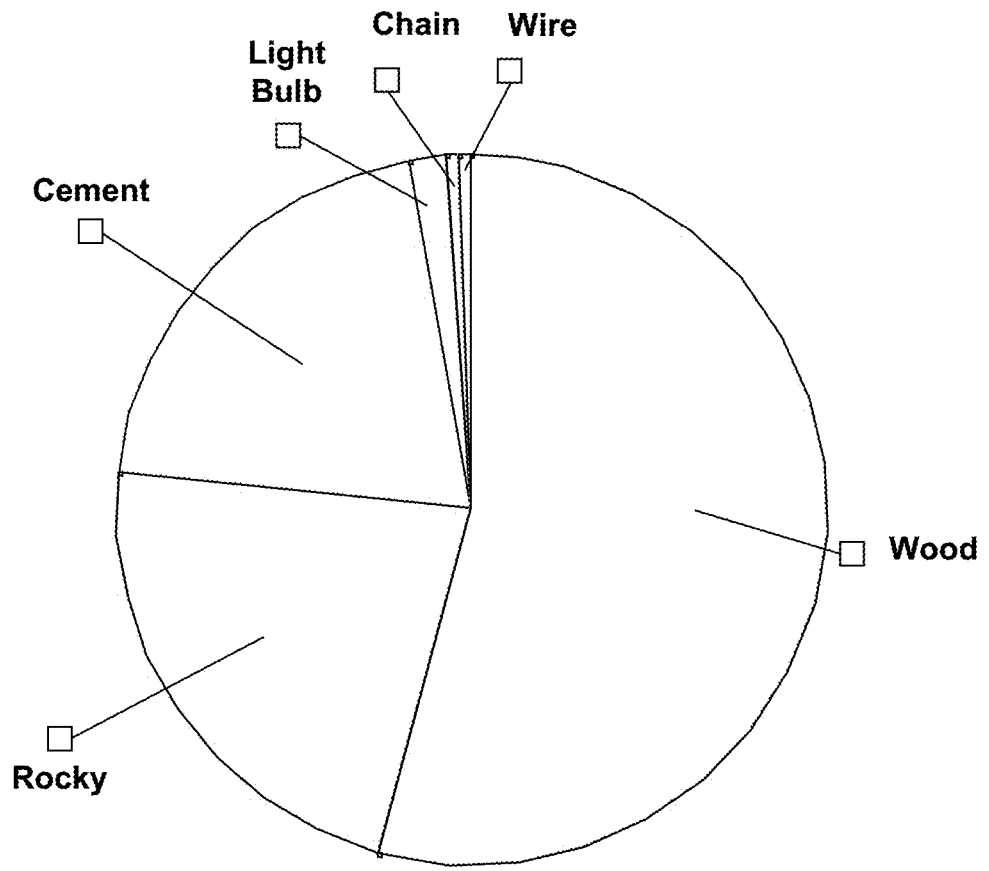
FIG. 9 illustrates an example of a plot of substrates.

Field observations show that out of 175 nests 54.29% were constructed on wood substrates, 22.29% on rocky substrates, and 20.75% on cement substrates (see, e.g., FIG. 9). A total of 5 nests were constructed on other substrates, such as a light bulb, chain, and electrical wire and make up the final 2.67% of observations. From these findings, wood seems to be the most preferred substrate. It seems that the wasps desire a substrate that is accessible and that has a specific texture suited to holding the mud. Wood may provide a good texture to build nests upon because mud may not stick if a surface is too smooth.

Once a substrate is chosen the female wasps begins nest construction. To construct her nest she must find a source of wet mud of the right consistency. She then collects a ball of mud in her mandibles, which is mixed with her saliva and applied to the substrate to form a tubular nest. This process can take from three hours, to 2 to 3 days to complete. Less than half of the nests were constructed with one source of mud, and a larger portion constructed with two or more sources of mud. This could possibly be because the availability and consistency of near-by mud sources varies at each site.

Figure 2:
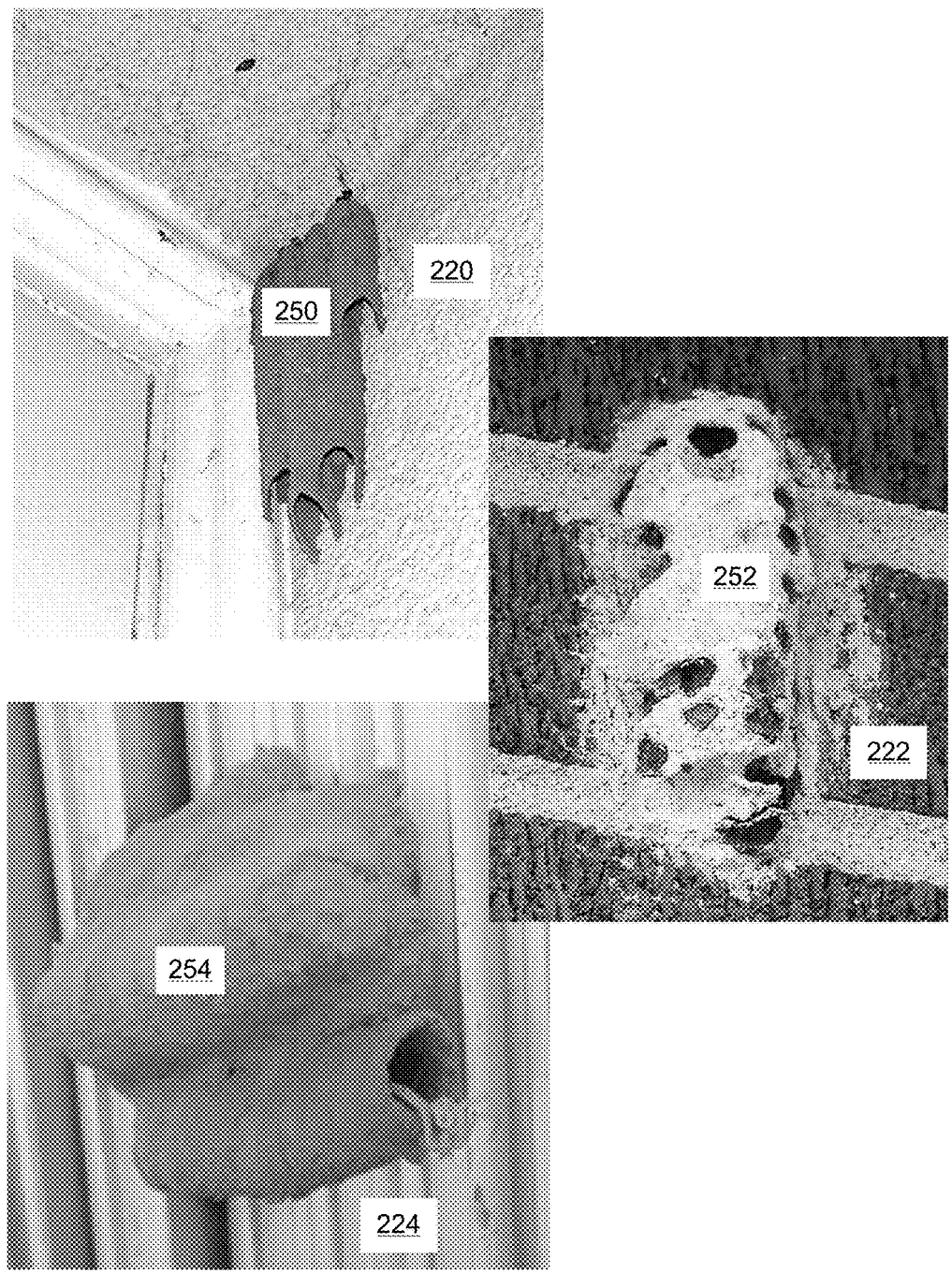
FIG. 2 shows photographs of nests.

FIG. 2 shows photographs of some examples of nests 250, 252 and 254 on substrates 220, 222 and 224, respectively.

Insects can be a nuisance (e.g., to humans and other animals). Insect nests can be a nuisance. Insect nests can damage substrates. Insect nests can discolor substrates. Insect abatement and/or nest abatement can help to reduce such nuisances and/or damages.

As an example, an assembly can include features to remove and clean up an insect mud nest. As an example, an insect mud nest may be built at least in part from mud nests from mud and may be attached to a substrate of a structure (e.g., a house, an out-building, a greenhouse, etc.). As an example, a nest may be built in a relatively dry elevated area such as under eaves or porches. They encase paralyzed spiders in the cells of the nest and then lay an egg so the soon to be hatched larvae can feed on the spiders as they grow. They seal off these chambers and leave their eggs to hatch and mature. They will then eventually leave the mud nest and fly off after breaking out of the sealed mud chamber. Owners and/or operators of structures are then left with the mud nest attached as a nuisance.

As an example, an assembly can be a telescopic tool that includes a hard plastic wedge on one end of an adjustable head that can be used to break up a nest. It may also be used to scrape the nest debris off of a substrate of a structure that it has been affixed. As an example, another end of the head can include an imbedded scrub brush. For example, consider a head that includes passages and openings where water can flow from a source (e.g., via the pole or other tubing) to pass through the head and scrub brush so the remaining debris can be scrubbed off of the substrate.

As an example, a top/bottom of the head can include semi-stiff Mud Dauber Removal Tool bristles for scrubbing, optionally with water (e.g., and/or one or more other substances). As an example, another end can include stiffer bristles for the stubborn parts that cannot be removed as easily.

As an example, a pole to which a head can be attached to can be a telescopic pole that can be extended, for example, to reach higher areas where a nest or nests may be found. As an example, a pole may be hollow and include a hose attachment on the end so a garden hose can be attached.

When the attached garden hose is attached and the switch at a base is in the "On" position water can flow up the pole and come out of the holes imbedded into the brush end of the head. As an example, a conduit (e.g., tubing) may be disposed within a hollow pole and/or may be otherwise affixed to a pole (e.g., akin to a fishing pole).

As an example, remaining nest debris may be removed with a scrub brushing action where water or other solution may be used, for example, to soften the attached nest debris; washing it away cleaning the surface where the nest was attached.

As an example, a pole can include an adjustable handle that can be moved up and down the pole. Such a handle may be utilized to gain leverage for the scraping and brushing of an attached insect nest. As an example, joints can include locking mechanisms that can secure extended pieces and, for example, where appropriate, prevent water from leaking out. As an example, an assembly can include a foam handle, for example, around an end of the pole so the user can have a firm grip on the pole while in use.

Figure 3:
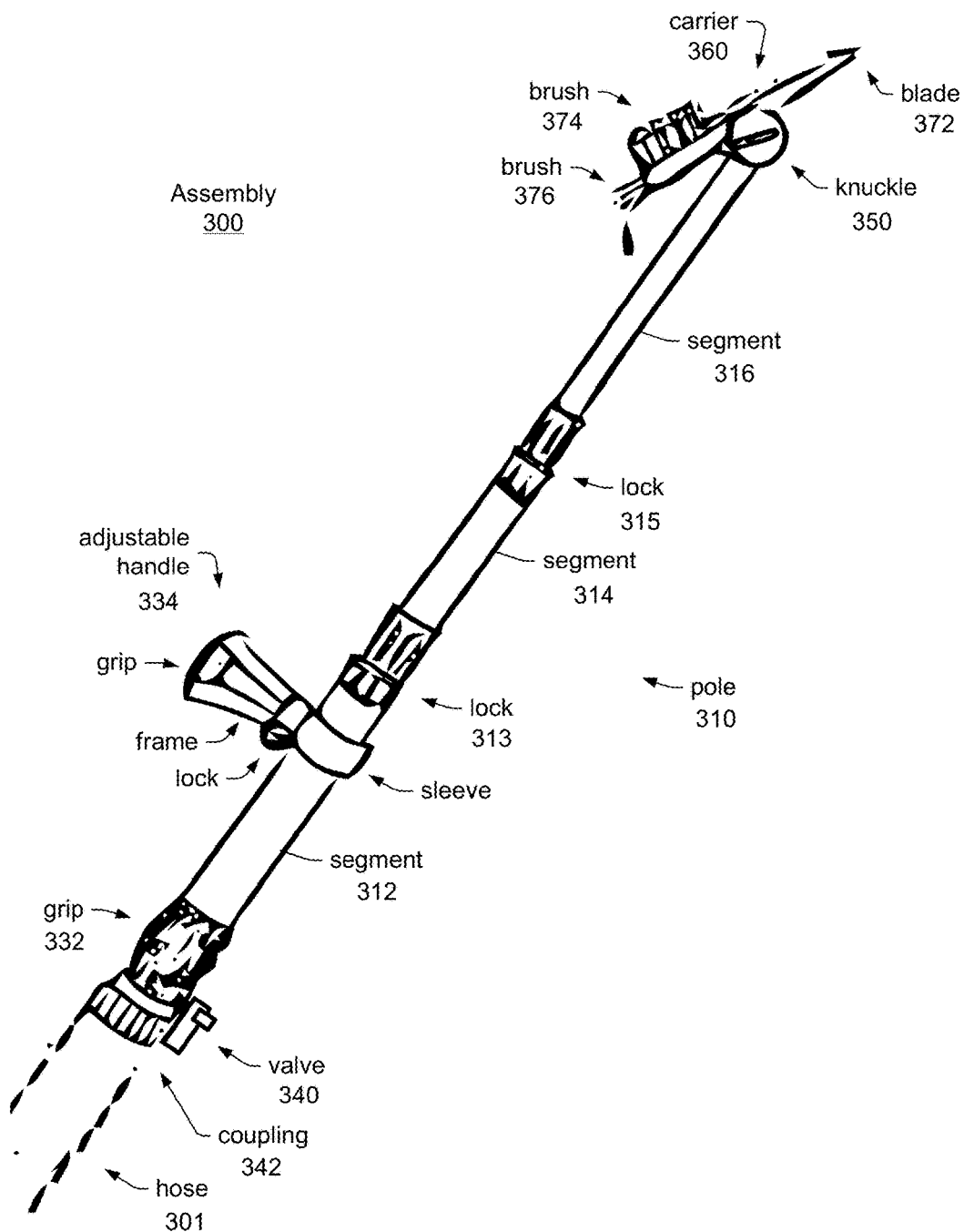
FIG. 3 illustrates an example of an assembly.

FIG. 3 illustrates an example of an assembly 300 that includes a pole 310 that includes segments 312, 314 and 316 and locks 313 and 315. As shown, a knuckle 350 can allow for attachment of an adjustable head that includes a carrier 360 with various features such as, for example, a blade 372 (e.g., optionally integral or optionally separate) and one or more brushes 374 and 376.

In the example of FIG. 3, the assembly 300 includes an adjustable handle 334, which may be positioned along the segment 312 and secured in position. As an example, one hand of a user may utilize the handle 334 to apply pressure to the head end of the assembly 300. As an example, the handle 334 may be utilized to maneuver the head end of the assembly 300 such that the head moves. For example, the head may rotate about an axle such that a portion of the head can be positioned to utilize that portion to abate a nest, to repair a substrate, etc. As an example, the handle 334 can include a frame and a grip where, for example, the frame may include one or two legs that extend to the grip. As an example, the handle 334 can include a lock that can cause a sleeve to become fixed with respect to an axial and/or angular position on the pole 310.

As an example, a grip of a handle may allow for control of the carrier 360, for example, when the pole 310 is telescopically or otherwise extended. For example, a handle may have a substantially trapezoidal or triangular shape with a grip portion as a cross-member where force can be applied to the grip portion via a hand, which may be a palm portion of a hand to exert force that may cause the blade 372 to scrape or otherwise forcibly contact a nest, a portion of a nest, etc. As an example, a grip of an adjustable handle may be adjusted by a user to achieve a desired range of motion, a desired range of arm bending or shoulder flexing to apply force and/or to allow for a sweeping motion that can sweep the carrier 360. As an example, an adjustable handle may be utilized to cause a motion of the assembly 300 at the carrier 360 to cause the carrier 360 to rotate or otherwise change its orientation on the pole 310 (e.g., from a blade end to a brush end and/or vice versa, etc.).

In the example of FIG. 3, the assembly 300 includes a grip 332, which may be disposed at a position that is below the handle 334. As shown, the assembly 300 can include a valve 340 and a coupling 342 where fluid from a hose 301 may be selectively controlled (e.g., on, off, flowrate, etc.).

Figure 4:
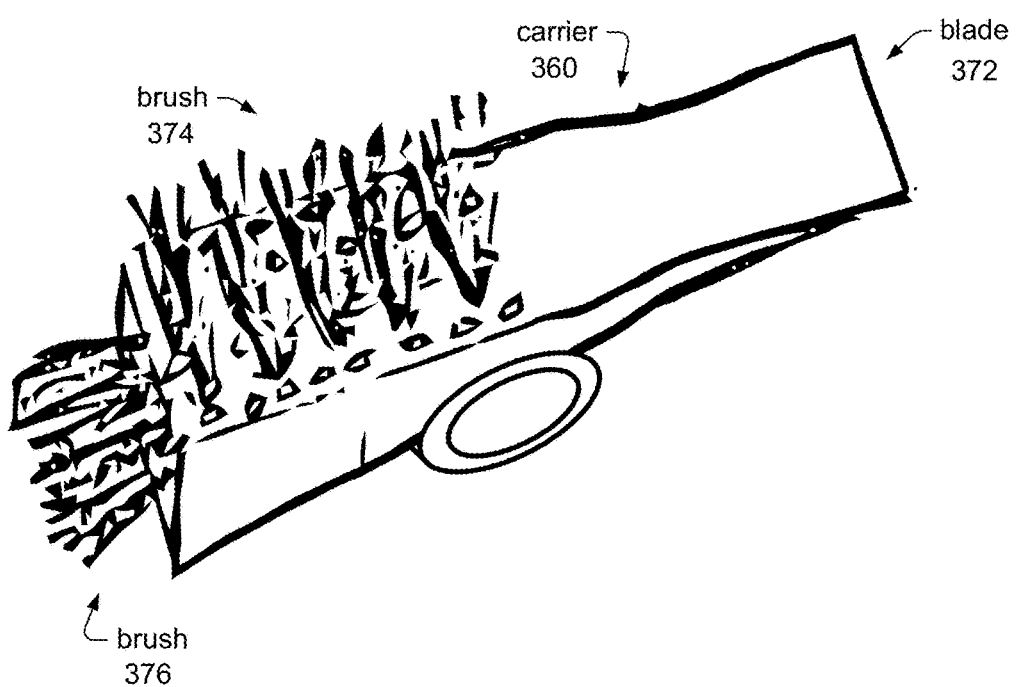
FIG. 4 illustrates an example of a portion of an assembly.

FIG. 4 illustrates an example of the head of the assembly 300 of FIG. 3. As shown, the carrier 360 carries a blade 372, which may be integrally formed into the carrier. For example, the carrier 360 may be manufactured from a hard plastic, a hard composite material, metal, alloy, etc., where an end is fashioned as a scrapper blade that can be guided along a relatively planar substrate to remove a bulk portion of a nest from the substrate.

Figure 5:
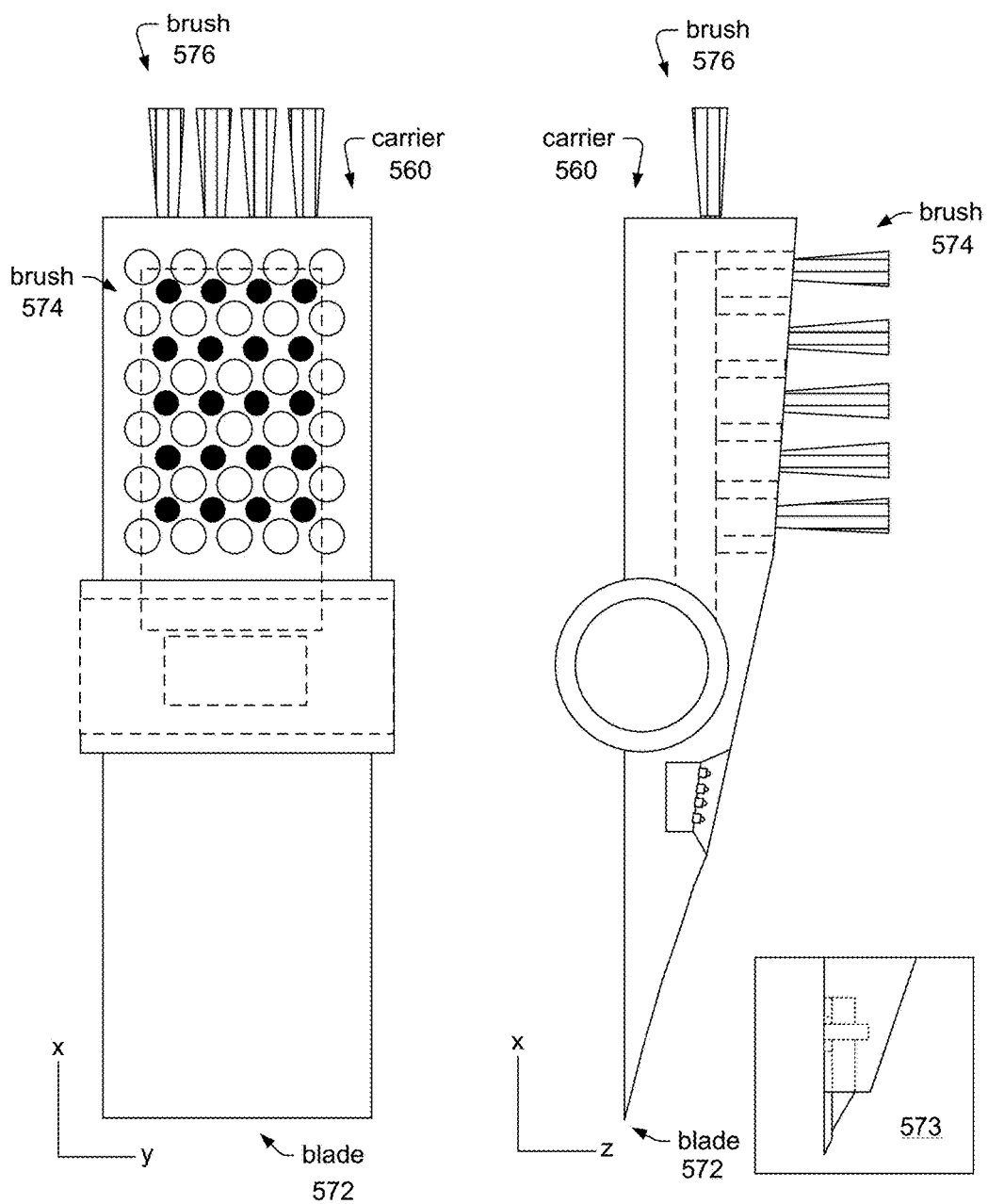
FIG. 5 illustrates an example of a portion of an assembly.

FIG. 5 illustrates an example of a head that may be suitable for use as the head of the assembly 300 of FIG. 3. As shown, a carrier 560 includes passages for flow of fluid (e.g., air, water, solution, etc.). As an example, a coupling mechanism can provide for flow of fluid to the passages. As an example, the carrier 560 can include circuitry. For example, a battery and LEDs may be included to illuminate a region of a structure. Such illumination may allow for judgment as to cleanliness of a substrate, occupation of a nest, etc.

As shown in FIG. 5, the carrier 560 may include a blade attachment mechanism 573, for example, to select and attach a blade that may be suited for use on a particular substrate. As an example, a hard plastic attachment may be suitable for certain substrates so as to not damage the finish thereof. As an example, a metal blade may be suitable for some substrates such as, for example, brick which may tolerate some amount of scraping by a metal blade. As an example, a hard plastic may be a thermoplastic resin or other suitable material.

As an example, a brush or brushes may be formed of synthetic and/or natural materials. As an example, a brush may include metallic bristles. As an example, a brush may include synthetic fiber bristles. As an example, a brush may be suitable for scrubbing a substrate. As an example, a type of brush and/or type of bristles may be selected based at least in part on a substrate and/or a substrate's finish (e.g., paint, stain, etc.).

Figure 6:
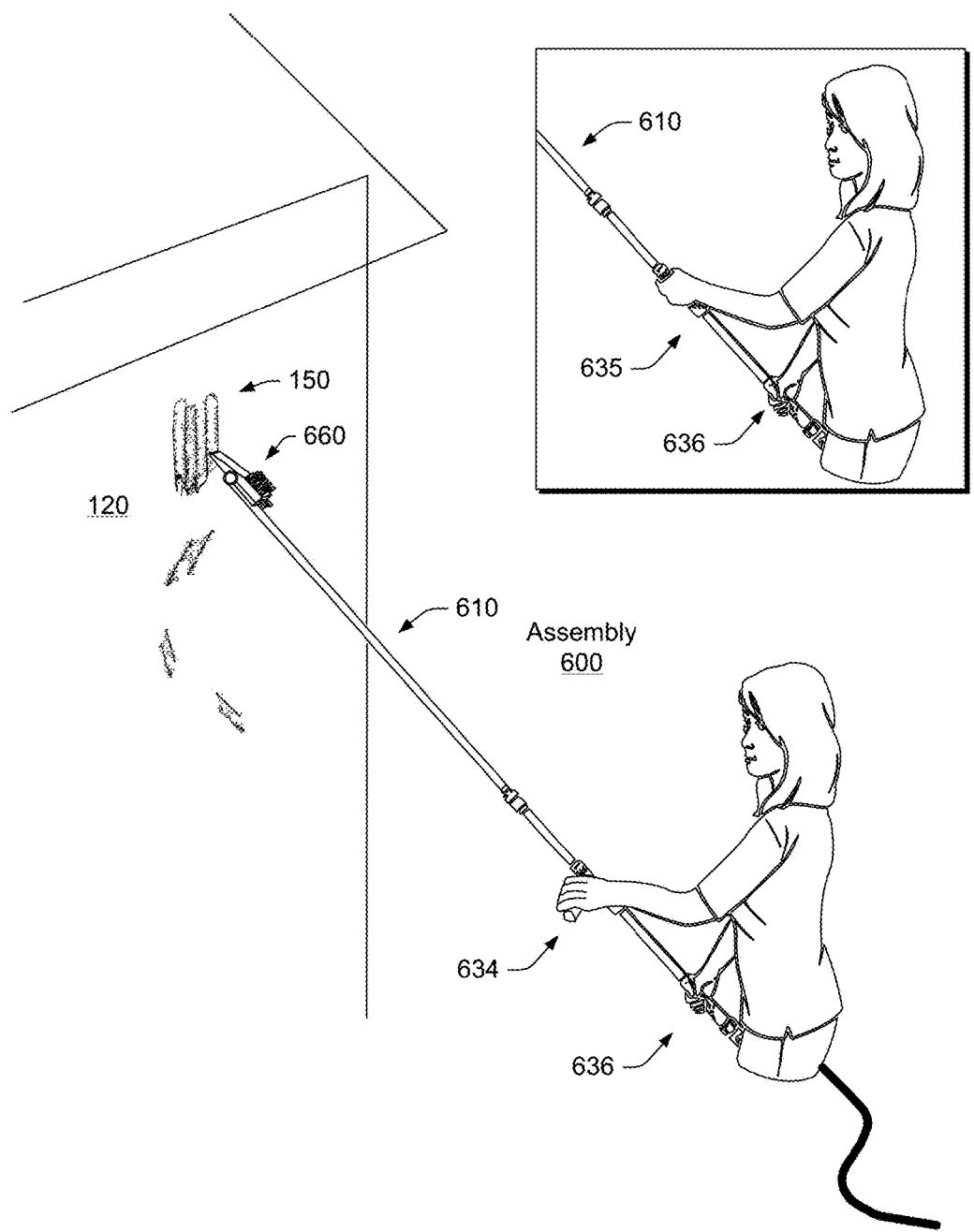
FIG. 6 illustrates an example of a method.

FIG. 6 illustrates an example of a method where a portion of a nest 150 is being removed from a substrate 120 of a structure via use of a blade portion of an assembly 600. As shown, a pole 610 of the assembly 600 can be telescoping to allow for reaching places with a head 660 operatively coupled to the pole 610 where such places may be near a roof line, etc.

In the example of FIG. 6, the assembly 600 can include a side handle 634, which may be adjustable along the pole 610. For example, the side handle 634 may be adjustable along a longitudinal axis of the pole 610 and/or azimuthally about the longitudinal axis of the pole 610. In such an example, the side handle 634 may be adjusted to accommodate a left hand or a right hand while a right hand or a left hand is located at another position 636 along the pole 610. FIG. 6 also shows an example where a user may grasp the pole 610 at a position 635 with one hand and at a position 636 with another hand.

Figure 7:
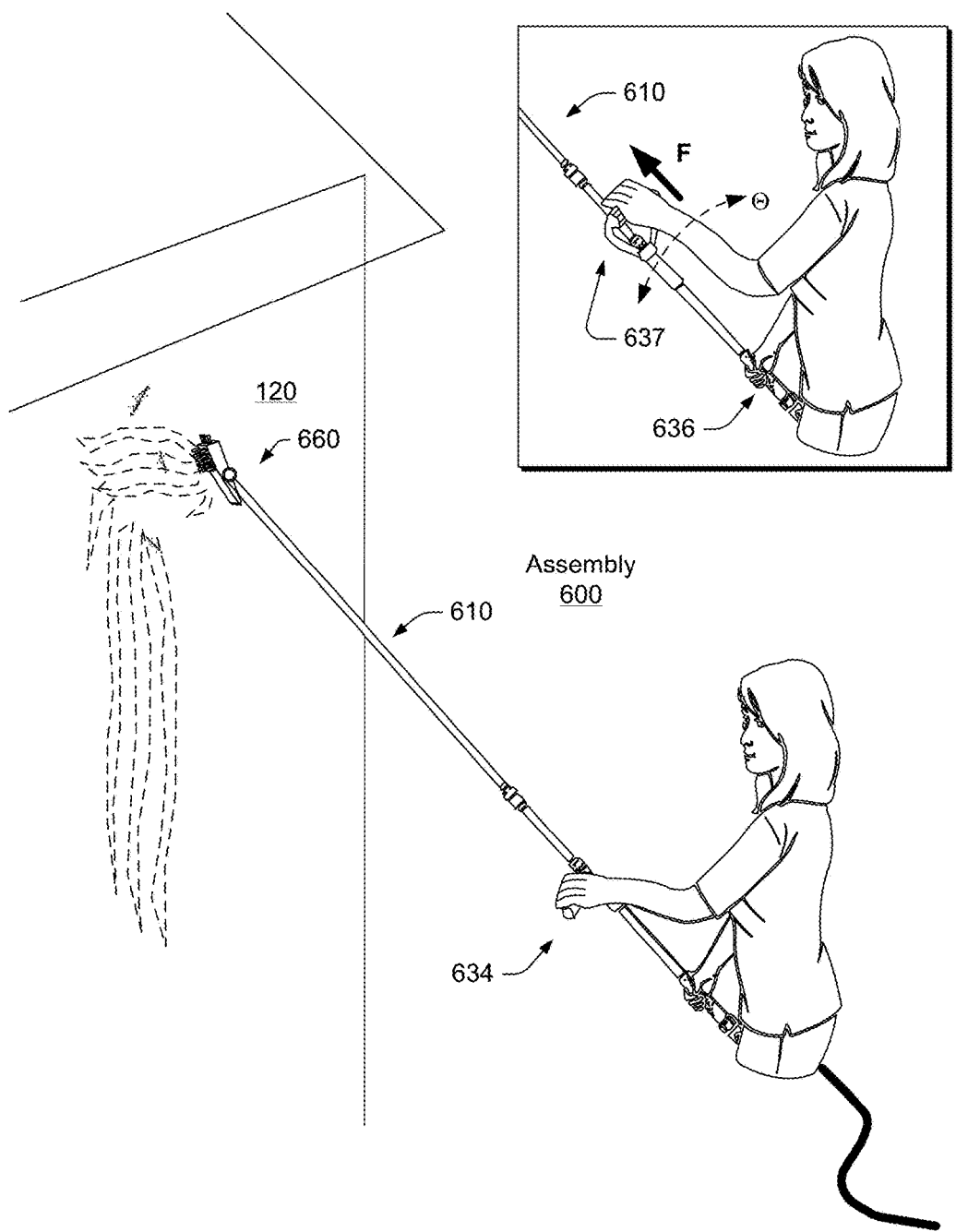
FIG. 7 illustrates an example of a method.

FIG. 7 illustrates an example of a method where a portion of a nest 150 is being removed from a substrate 120 of a structure via use of a brush portion of the head 660 of the assembly 600, optionally with flow of fluid (e.g., water, air, solution, etc.). For example, the assembly 600 can include various features where such features may be attached to a rotatable carrier or head (e.g., the head 660 may be mounted via a mechanism that allows it to flip or otherwise rotate, etc.). In such an example, a movement of the pole 610 may cause the head 660 to rotate. As an example, a lock mechanism may be actuatable via a lever or other feature near a handle portion of the pole 610 (e.g., a position at or about the side handle 634 or at or about the position 636). As an example, the side handle 634 may allow for controlled movement of the end of the pole 610 to cause the head 660 to rotate to a desired orientation to perform a task such as, for example, a nest removal task via a blade or a nest debris removal task via a brush.

As shown in an inset view in FIG. 7, a handle 637 may include a cross-member that is part of a frame that may be adjustable as to its axial and/or angular position on the pole 610. As shown, a user may apply force to the cross-member to cause the pole 610 and its head 660 to forcibly contact a nest and/or a substrate. As an example, a cross-member can be a grip, for example, with an elastomer or other type of material or coating that may facilitate gripping by a hand and/or frictional contact between a hand and the cross-member; noting that a hand may be, for example, in a glove such that the glove contacts the cross-member. As shown, the handle 637 may allow for a sweeping action where, for example, a grip at the position 636 may be a base about which sweeping occurs. As an example, the handle 637 may optionally be an ambidextrous handle such that the assembly 600 can be utilized with a left hand or a right hand on the handle 637.

As an example, one or more controls may be optionally mounted to or an integral portion of a handle, for example, consider one or more of a light switch, a fluid switch, an adjustment switch, etc.

Figure 8:
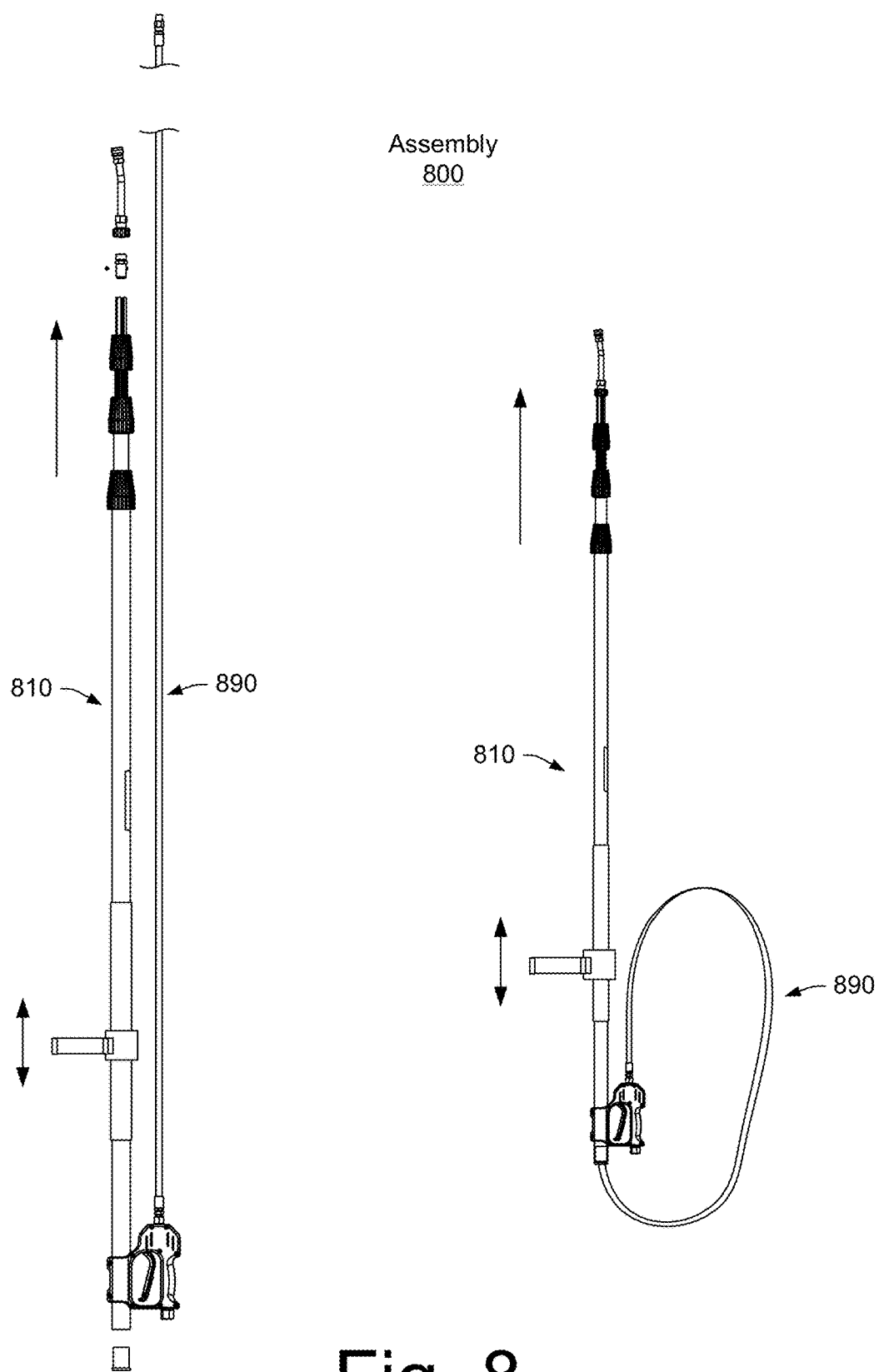
FIG. 8 illustrates an example of a portion of an assembly.

FIG. 8 illustrates an example of a portion of an assembly 800. In the example of FIG. 8, tubing 890 is slidable within a hollow pole 810. As an example, such tubing may be suitable for water, air, solution, mixture of water and air, etc.

FIG. 9 illustrates an example of a plot of some examples of substrates. As shown, wood predominates for the species to which the plot corresponds, followed by rocky and cementitious substrates. As an example, an assembly can include a head portion (e.g., carrier, etc.) that can be suitably utilized for nest removal from wood and optionally one or more other substrates (e.g., rocky and/or cementitious). As an example, depending on geography, an assembly may include a particular head portion. As an example, an assembly may be packaged as a kit with various head portions and/or with features that can be fit to a head portion. In such an example, features may be associated with substrates, species of insect, types of mud, etc.

Figure 10:
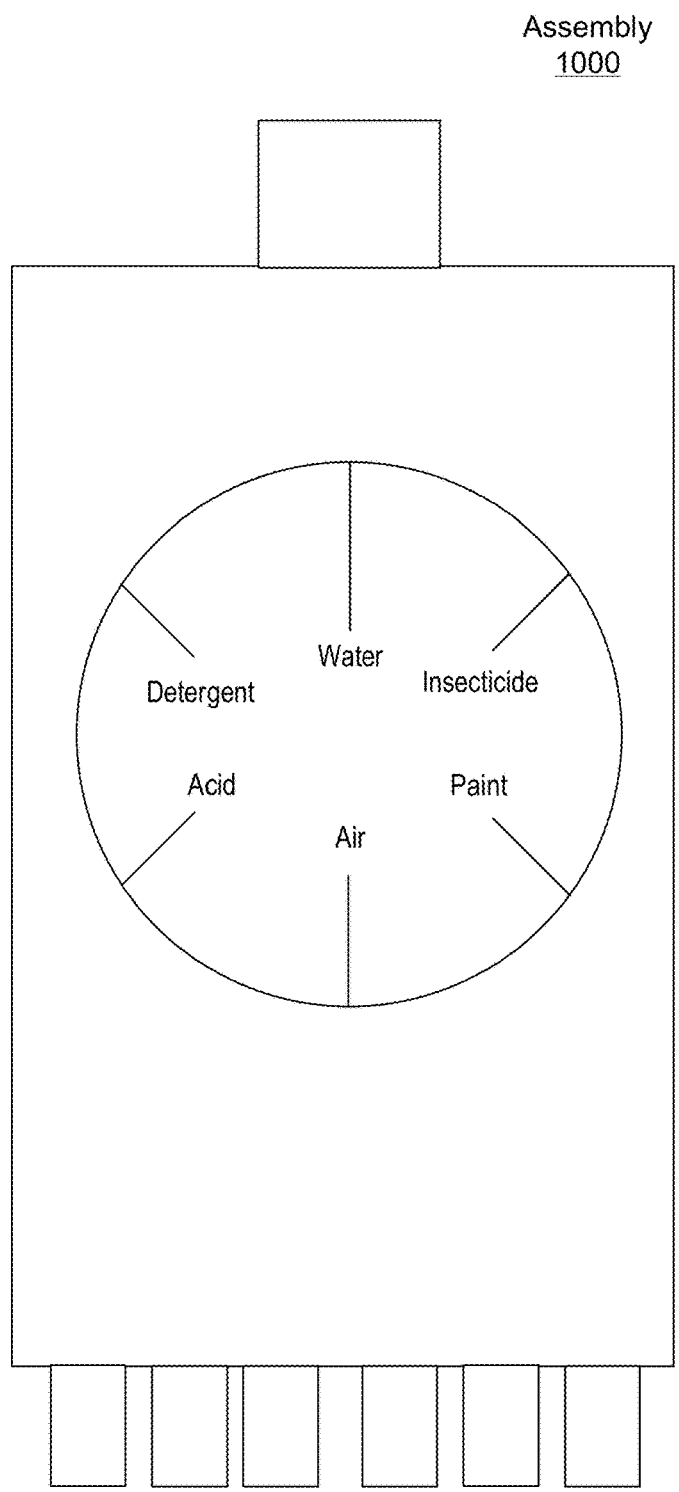
FIG. 10 illustrates an example of a portion of an assembly.

FIG. 10 illustrates an example of a portion of an assembly 1000 that includes a control knob that can be rotated to select a feed line as output. For example, consider feed lines for one or more of water, detergent (e.g., as a solution), acid, insecticide, paint and air.

Inorganic soils can include hard water, rust, scale, minerals, sand, and clay. A detergent for removal of such soils can include a mixture of organic and inorganic cleaning agents. As an example, a detergent can include one or more of surfactant, chelant and builder. As an example, a detergent can include bleach. As an example, a detergent can be of a pH that is suitable for use with a substrate, which may be a coated substrate (e.g., sealed brick, painted brick, sealed cement, painted cement, sealed wood, painted wood, stained wood, etc.).

As an example, an acid may be or include phosphoric acid. As an example, an acid may be or include muriatic acid. As an example, a detergent can include TSP (trisodium phosphate), which may be suitable to clean masonry surfaces.

As an example, an insecticide may be or include a wasp insecticide. As an example, liquid formulations of insecticides intended for control of wasps, yellowjackets, and hornets include numerous formulations containing allethrin, benzylcarbinyl propionate plus eugenol, chlorpyrifos, cyfluthrin, cypermethrin, D-phenothrin, diazinon, dichlorvos, esfenvalerate, linalool, permethrin, prallethrin, propoxur, pyriproxyfen, resmethrin, synergized pyrethrins, tetramethrin, and tralomethrin.

As an example, dust formulations may be utilized. Active ingredients in these formulations can be effective against wasps and can include bendiocarb, cyfluthrin, deltamethrin, diazinon, permethrin, synergized pyrethrins, and silica gel.

Figure 11:
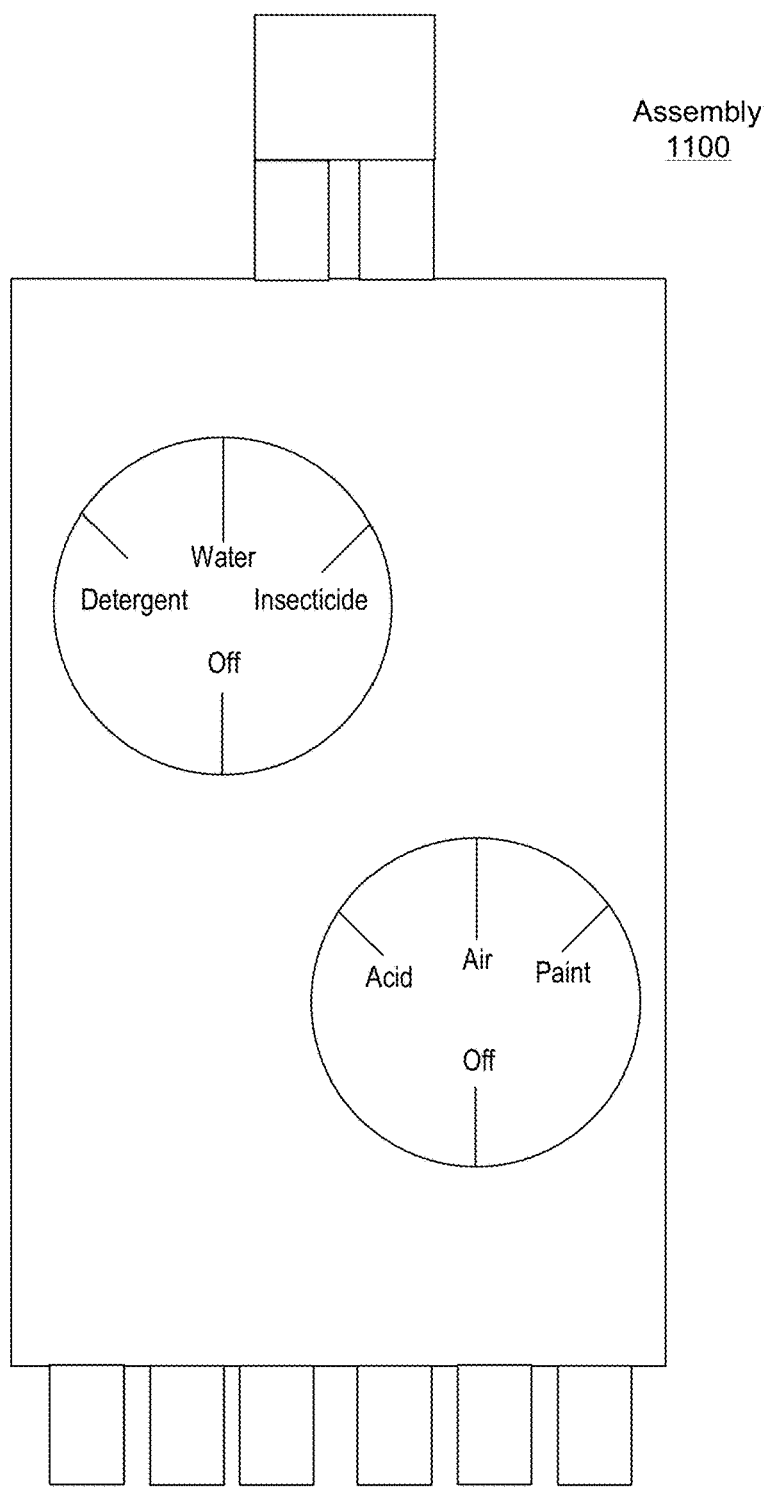
FIG. 11 illustrates an example of a portion of an assembly.

FIG. 11 illustrates an example of a portion of an assembly 1100 where two sets of feed lines are included and controlled via two corresponding control knobs. In such an example, a fluid from the first set may be selected in addition to a fluid from the second set. In such an example, mixing may occur as selected fluid may be combined to flow via a common outlet.

Figure 12:
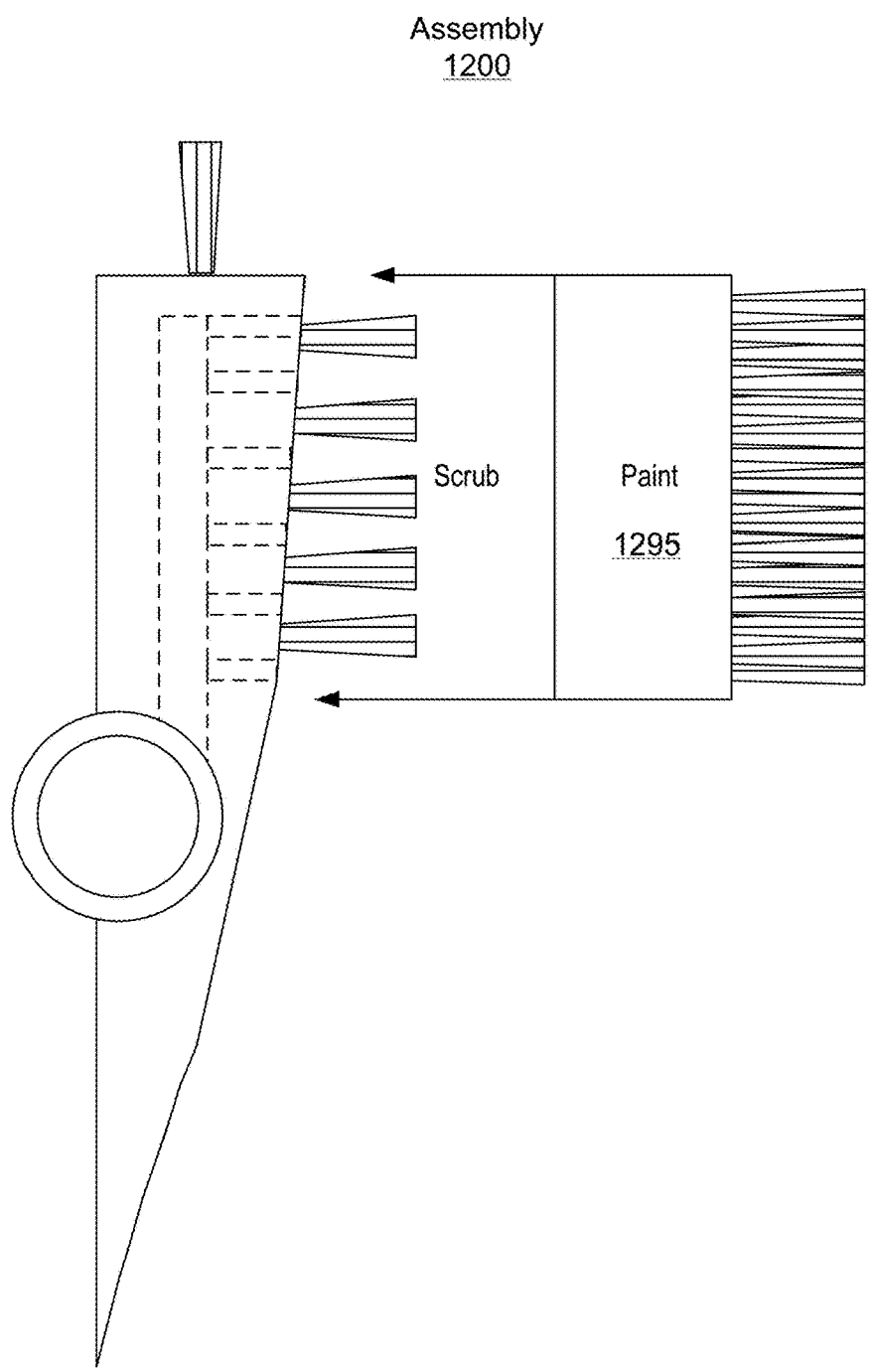
FIG. 12 illustrates an example of an attachment as a portion of an assembly.

FIG. 12 illustrates an example of an attachment as a portion of an assembly. In the example of FIG. 12, the attachment is a paint brush attachment. As an example, paint may be applied to the attachment which may then be fixed to a head portion of an assembly. As an example, an assembly may provide for flow of paint via a head portion to a paint brush.

While FIG. 12 shows a paint brush, as an example, an attachment may be a paint roller or other painting attachment. As an example, an attachment may be a sandpaper attachment or, for example, an attachment with an abrasive material to clean or otherwise prepare a substrate for further conditioning, painting, etc.

Figure 13:
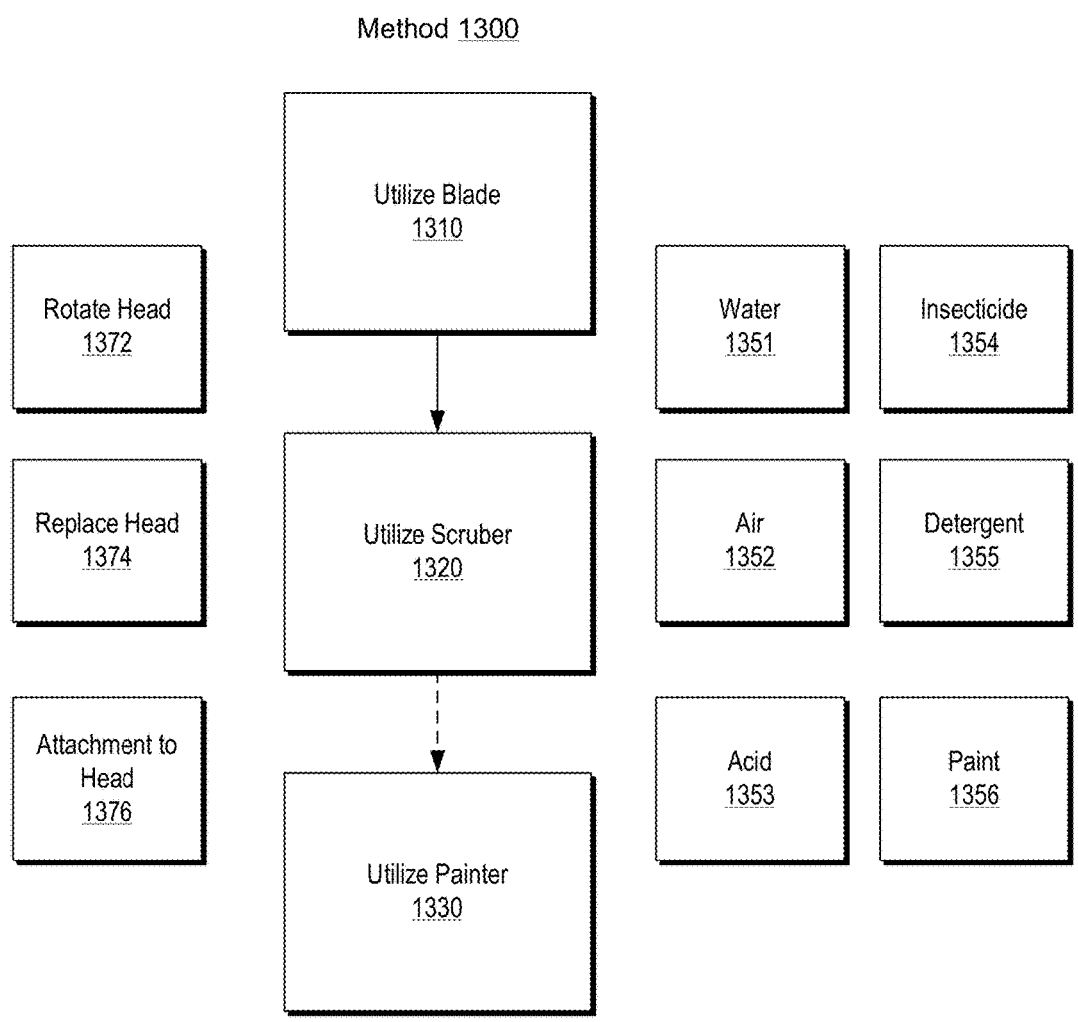
FIG. 13 illustrates an example of a method.

FIG. 13 illustrates an example of a method 1300 that includes a utilization block 1310 for utilizing a blade of an assembly, a utilization block 1320 for utilizing a scrubber of an assembly and an optional utilization block 1330 for utilizing a painter of an assembly.

In the example of FIG. 13, blocks 1351 to 1356 correspond to substances that may be utilized in the method 1300 while blocks 1372, 1374 and 1376 correspond to features of an assembly that may be utilized in the method 1300.

Although various examples of methods, devices, systems, designs, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, designs, etc.

The invention claimed is:

1. An insect nest removal assembly comprising:
    a telescopic pole including a fluid coupling at one end, a head coupling at another end, and a sealed hollow interior extending an entire length between the fluid and head couplings;
    a head connected to the head coupling, the head including a blade, a first brush and a second different brush spaced apart from the first brush, and a passage in fluid communication with the sealed hollow interior of the telescopic pole and at least one of the first and second different brushes; and
    a valve connected to the telescopic pole and arranged to control a fluid flow to the hollow interior of the telescopic pole.

2. The insect nest removal assembly of claim 1 further comprising the head including a top side located opposite the head coupling and two distal side ends left and right of the head coupling, the blade being located on the top side toward one of the two distal side ends of the head and at least one of the first and second different brushes being located on the top side toward another of the two distal side ends of the head and spaced apart from the blade.

3. The insect nest removal assembly of claim 1 further comprising at least one other brush of the first and second different brushes being located on a distal side end of the head opposite that of the blade.

4. The insect nest removal assembly according to claim 1 further comprising the head including a wedge-shaped portion ending in the blade.

5. The insect nest removal assembly of claim 1 further comprising the head including at least one light and associated light circuitry and power source.

6. The insect nest removal assembly of claim 5 wherein the at least one light is an LED light.

7. The insect nest removal assembly of claim 6 wherein the at least one light is located on a top side of the head between the at least one brush and the blade.

8. The insect nest removal assembly of claim 1 further comprising the head coupling being a pivoting joint.

9. The insect nest removal assembly of claim 1 further comprising the valve including a multi-feed control unit.

10. The insect nest removal assembly of claim 9 further comprising the multi-feed control unit including a selector for selection of a first fluid and a second different fluid.

11. The insect nest removal assembly of claim 10 wherein at least one of the first fluid and the second different fluid is a fluid selected from the group consisting of water, air, detergent, acid, paint, and insecticide.

12. The insect nest removal assembly of claim 1 further comprising a detachable handle connected to the telescopic pole between the fluid and head couplings and extending in a sideward direction from the telescopic pole.

13. An insect nest removal assembly comprising:
a telescopic pole including a fluid coupling at one end, a pivot joint at another end, and a sealed hollow interior extending an entire length between the fluid coupling and the pivot joint;
a head connected to the pivot joint, the head including a blade at one end, at least one brush located toward another end, and a passage in fluid communication with the sealed hollow interior of the telescopic pole and the at least one brush;
a valve connected to the telescopic pole and arranged to control a fluid flow to the hollow interior of the telescopic pole; and
a light arranged on a top side of the head and in communication with associated light circuitry and power source.

14. The insect nest removal assembly of claim 13 further comprising a detachable handle connected to the telescopic pole between the fluid and head couplings and extending in a sideward direction from the telescopic pole.

15. An insect nest removal assembly comprising:
a telescopic pole including a fluid coupling at one end, a head coupling at another end, and a sealed hollow interior extending an entire length between the fluid and head couplings;
a head pivotally connected to the head coupling; and
a valve connected to the telescopic pole and arranged to control a fluid flow to the sealed hollow interior of the telescopic pole;
the head including:
a top side located opposite the head coupling and two distal side ends left and right of the head coupling;
a blade located on the top side toward one of the two distal side ends of the head;
a first brush located on the top side toward another of the two distal side ends of the head and spaced apart from the blade;
a second different brush located on the another of the two distal side ends and spaced apart from the first brush located on the top side; and
a passage in fluid communication with the sealed hollow interior of the telescopic pole and at least one of the first and second different brushes.

16. The insect nest removal assembly of claim 15 further comprising the head including at least one light and associated light circuitry and power source.

17. The insect nest removal assembly of claim 15 further comprising a detachable handle connected to the telescopic pole between the fluid and head couplings and extending in a sideward direction from the telescopic pole.

* * * * *